United States Patent [19]

Schnerer et al.

[11] Patent Number: 5,568,388
[45] Date of Patent: Oct. 22, 1996

[54] METHOD AND SYSTEM FOR AUTOMATICALLY CALIBRATING CONTROL LOGIC OF A VEHICLE CONTROL SYSTEM

[75] Inventors: Peter W. Schnerer, Dearborn Heights; Timothy J. Schnobel, Saline; Brian C. Tuck, Ann Arbor, all of Mich.

[73] Assignee: Kelsey-Hayes Company, Livonia, Mich.

[21] Appl. No.: 394,753

[22] Filed: Feb. 27, 1995

[51] Int. Cl.⁶ ........................................ G06F 19/00
[52] U.S. Cl. ............... 364/424.01; 364/425; 364/571.07
[58] Field of Search ................ 364/424.01, 424.04, 364/424.03, 431.11, 425, 571.01, 571.04, 571.07

[56] References Cited

U.S. PATENT DOCUMENTS

| | | | |
|---|---|---|---|
| 4,084,240 | 4/1978 | Lappington | 364/425 |
| 4,478,193 | 10/1984 | Watanabe | 123/489 |
| 4,618,954 | 10/1986 | Otobe et al. | 371/16 |
| 4,623,976 | 11/1986 | Carp et al. | 364/571.07 |
| 4,700,304 | 10/1987 | Byrne et al. | 364/426.02 |
| 4,811,808 | 3/1989 | Matsumoto et al. | 180/197 |
| 4,829,439 | 5/1989 | Otobe | 364/431.04 |
| 5,091,858 | 2/1992 | Pailelli | 364/431.12 |
| 5,200,900 | 4/1993 | Adrain et al. | 364/431.12 |
| 5,265,576 | 11/1993 | McMahon et al. | 123/458 |
| 5,313,924 | 5/1994 | Regueiro | 123/456 |
| 5,394,327 | 2/1995 | Simon, Jr. et al. | 364/424.01 |

*Primary Examiner*—Collin W. Park
*Attorney, Agent, or Firm*—Brooks & Kushman P.C.

[57] ABSTRACT

A non-volatile RAM stores a selectable trim indicator which, in turn, is used to select one of a plurality tables of trim constant data from read-only memory. The selected table of trim constant data is loaded into working memory of a microprocessor-based control unit to thereby calibrate control logic of an automotive ABS for the vehicle in which the control unit is mounted.

16 Claims, 2 Drawing Sheets

METHOD AND SYSTEM FOR AUTOMATICALLY CALIBRATING CONTROL LOGIC OF A VEHICLE CONTROL SYSTEM

TECHNICAL FIELD

This invention relates to methods and systems for automatically calibrating a vehicle control system and, in particular, to methods and systems for automatically calibrating control logic of a vehicle control system which includes a vehicle-mounted, microprocessor-based control unit.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Referring now to FIG. 1, a schematic diagram of a motor vehicle is shown, denoted generally by reference numeral 10, in conjunction with a prior art passenger vehicle anti-lock brake system (ABS). The vehicle 10 has mounted therein a brake pedal 12, a brake switch 13, a brake master cylinder 14 operated by the brake pedal 12, control valves and pump, collectively indicated at 16, brake fluid conduits 18, 20, 22, 24, 26 and 27 as well as a right front wheel 28, a left front wheel 30, and a pair of rear wheels 32.

A pair of vehicle wheel speed sensors 34 measure the velocity of each of the front wheels 28 and 30, and a pair of vehicle wheel speed sensors 36 measure the velocity of each of the rear wheels 32. The ABS further includes an ABS electronic control unit 38. The control unit 38 typically includes one or more commercially available microprocessors.

Each of the wheel sensors 34 and 36 are operatively connected to the control unit 38, which is itself operatively connected to the anti-lock brake system power relay at 16. Such operative connections are preferably electrical, but may also be other types of connections, such as fiber optic.

As is well known in the art, each of the wheel speed sensors 34 and 36 may comprise a stationary variable reluctance sensor (not shown) positioned adjacent a toothed wheel (not shown) which rotates with its respective vehicle wheel 28, 30, 32. The variable reluctance sensors each generate a pulsed signal whose frequency varies directly with the speed of the respective vehicle wheels 28, 30, 32. Other well known wheel speed sensor configurations may also be employed.

Many vehicle programs include numerous vehicles and vehicle configurations. One result of such a large number of configurations is that numerous software versions are required where the difference is only due to trim constants which are different to compensate for different vehicle parameters such as wheel-tire inertia, load variation, brake sizes, center of gravity location, or suspension. Another reason to have numerous software versions is to obtain desired performance characteristics for different vehicle applications. As a result, numerous types of control units must be stocked.

The patent to Otobe (U.S. Pat. No. 4,829,439) provides a method of selectively adapting an electronic control unit for an internal combustion engine. An ECU is modified after installation to reflect either a manual or standard transmission.

The patent to Carp et al. (U.S. Pat. No. 4,623,976) provides an automatic calibration selection for an automobile control system which allows the use of a single ECU for a family of motor vehicles. External selection of a particular ROM address allows for adaptive calibration set selection.

The patent to Sinn (U.S. Pat. No. 4,908,760) uses a similar calibration strategy in a self-cleaning oven temperature control system.

The patent to McMahon et al. (U.S. Pat. No. 5,265,576) provides a master calibration set stored in an electronic control unit. The ECU master calibration set is modified by a separate calibration adjustment system to adjust for actual performance characteristics.

The patent to Paielli (U.S. Pat. No. 5,091,858) provides an electronic engine control unit (ECU) including a plurality of look-up tables. The system further includes a means to selectively vary the control parameters by initiating a programming mode of operation to up-load new tables.

The patent to Byrne et al. (U.S. Pat. No. 4,700,304) provides a ROM, typically an EPROM, which controls ECU microprocessor testing and resetting in an anti-skid braking system.

The patent to Watanabe (U.S. Pat. No. 4,478,193) provides a method of easily changing calibration data stored in a back-up Ram of an electronic control unit (ECU) for an internal combustion engine.

The patent to Otobe et al. (U.S. Pat. No. 4,618,954) provides a fault diagnosis system using an electronic control unit wherein internal calibration control parameters are dynamically substituted for malfunctioning sensors to prevent erroneous operation.

The patent to Regueiro (U.S. Pat. No. 5,313,924) provides an electronic control unit which can be programmed to accommodate various engine environmental and state conditions for optimal engine performance.

One problem associated with the prior art is that the wrong set of calibration data may be selected and, consequently, the ABS may not be properly calibrated for the vehicle being controlled.

SUMMARY OF THE INVENTION

It is an object of the present invention to provide a method and system for automatically and reliably calibrating control logic of a vehicle control system such as an automotive ABS including a vehicle-mounted microprocessor-based control unit wherein one software version is used for many different vehicle groups, thereby minimizing product count and simplifying product handling.

In carrying out the above object and other objects of the present invention, a method is provided for automatically calibrating control logic of a vehicle control system including a vehicle-mounted, microprocessor-based control unit including a first memory, an addressable second memory, and a working third memory. The method includes the steps of loading a selectable indicator into the first memory and loading a plurality of calibration tables into the second memory wherein each calibration table has a unique address and contains calibration data for a specific group of vehicles. The method further includes the steps of addressing one of the calibration tables based on the selectable indicator and loading the one of the calibration tables in the working third memory for automatically calibrating the control logic according to the vehicle in which it is mounted.

Further in carrying out the above object and other objects of the present invention, a system is provided for automatically calibrating control logic of a vehicle control system including a vehicle-mounted, microprocessor-based control unit including addressable memory and a working memory. The system includes a non-volatile memory for storing a selectable indicator and a plurality of addressable calibration tables stored in the addressable memory. Each calibration table has a unique address and contains calibration data which corresponds to characteristics of a particular group of vehicles. One of the calibration tables is selected by the selectable indicator to automatically load the calibration data required to calibrate the control logic of the control unit for the vehicle on which the control unit is mounted into the working memory to thereby automatically calibrate the control logic.

Preferably, the calibration data is trim constant data, and the selectable indicator has a value which is stored in non-volatile RAM and which is used to determine which calibration table to use.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
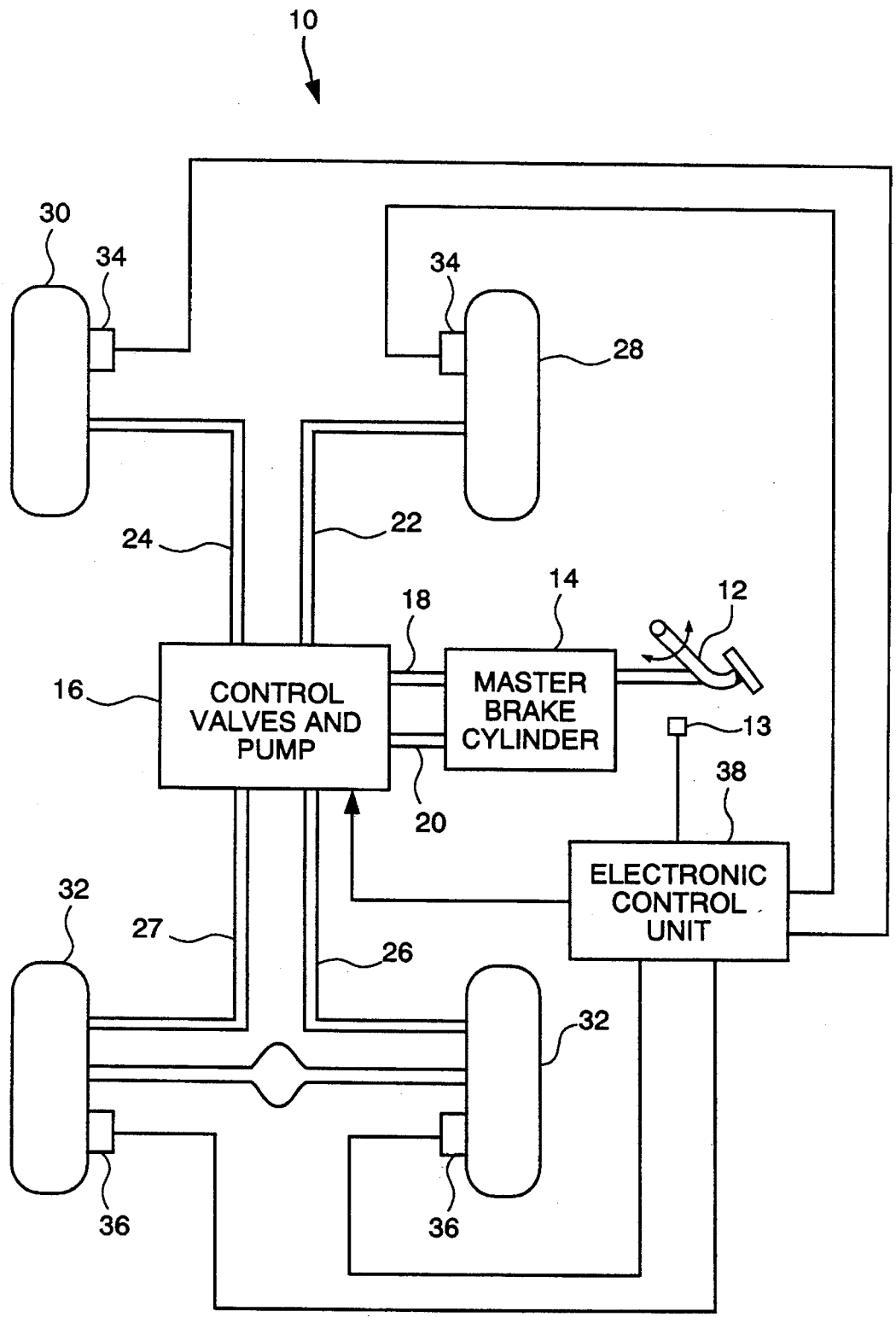
FIG. 1 is a schematic diagram of a vehicle and an interconnected prior art ABS.
Figure 2:
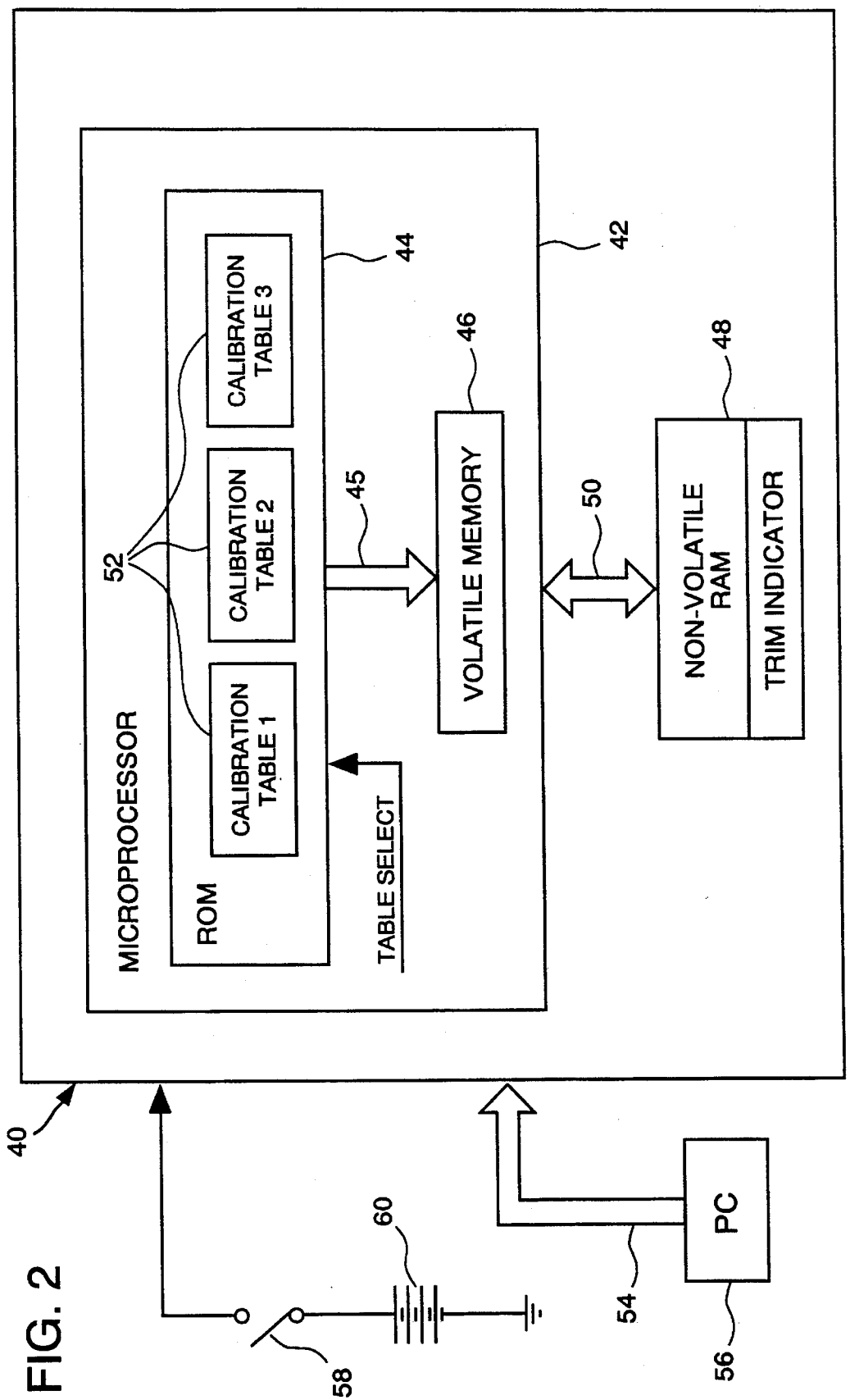
FIG. 2 is a schematic diagram of a microprocessor-based control unit including control logic calibrated in accordance with the method and system of the present invention.

Referring now to FIG. 2, there is illustrated a microprocessor-based control unit, generally indicated at 40, the control logic of which is to be calibrated in accordance with the method and system of the present invention. The control unit 40 is typically a semiconductor which may be a multi-chip module which is programmed to perform predetermined functions such as is required in an ABS or a traction control system. The control unit 40 includes a microprocessor 42 having an addressable ROM 44 and a volatile working memory (i.e. RAM) 46. The control unit may also contain programmable read-only memory (PROM), gate arrays, etc.

A databus 45 couples the microprocessor ROM 44 to the volatile memory 46. The control unit 40 also includes a non-volatile RAM (i.e. NVRAM) 48 which is coupled to the microprocessor 42 by means of a databus 50.

In order to minimize product count, trim constants which differ for different vehicle parameters and desired ABS performance characteristics are placed in vehicle specific calibration tables 52 in the ROM 44. This implementation allows for one software version to be used for different vehicles. Initially, a list of trimmable constants is agreed upon and this becomes the initial basis for the tables 52 in ROM 44. At compile time, the tables 52 and their associated constants are placed in upper ROM memory of the ROM 44. Typically, each constant requires one word of memory. For example, if one has three vehicle types and, for example, 60 selectable trim constants, one would have three separate tables in the ROM 42, each table is made up of 60 words, all three tables requiring 360 bytes of ROM assuming 2 bytes per word.

At an end-of-line tester such as a roller tester for testing an anti-skid braking system of a motor vehicle generally of the type described in U.S. Pat. No. 4,932,252, a number or pointer determining which vehicle type is being built is transferred via a bus (i.e. ALDL line or 9141 bus) 54 from, for example, PC 56, where the number will be written to the control unit's non-volatile RAM 48 (NVRAM) as a trim indicator. The pointer is referred to as a selectable trim indicator. On subsequent power-ups, the microprocessor 42 of the control unit 40 will get that number from the memory 48, verify that it is valid, and then use that number to determine the correct constant table 52 to use.

Obviously, downloading of the trim indicator could also occur not only in an automotive assembly plant but also at a service facility or wherever it is desirable or necessary to calibrate or recalibrate the control logic.

Preferably, the selectable trim indicator is stored in three locations within the memory 48. Storing the character (i.e. the indicator) in three locations gives triple redundancy and allows for fault correction if there is a problem with one character.

Each time an ignition switch 58 of the vehicle is turned on, allowing power-up current to flow from the vehicle's battery 60, the software within the microprocessor 42 looks at the three characters and determines if they are equal to each other. If all the characters are identical to each other, then that value will be used. If one character is different from the other two, the common value will be used. If all the characters are different or if the value from the three characters is invalid (does not correspond to any vehicle platform), then there is no indication of what trim table is to be used. In this case, the ABS will be disabled and the system must be serviced.

Once the pointer (i.e. the indicator) is selected, the access to the constants in the ROM 44, is preferably done by a pointer offset scheme.

Preferably, the microprocessor 42 is reset after the selectable trim indicator has been received and written to the memory 48. This allows the microprocessor 42 to execute a normal start-up and initialization procedure using the appropriate trim table for the particular vehicle.

Since the microprocessor 42 is reset after receiving the selectable trim indicator, the system will transmit a message to confirm which character was properly received. This feature enables the verification of a character without turning off the ignition, and consequently the engine, on the road test machine.

While the best mode for carrying out the invention has been described in detail, those familiar with the art to which this invention relates will recognize various alternative designs and embodiments for practicing the invention as defined by the following claims.

What is claimed is:

1. A method for automatically calibrating control logic of a vehicle control system including a vehicle-mounted, microprocessor-based control unit having a first memory, an addressable second memory, and a working third memory, the method comprising the steps of:

loading a selectable indicator into the first memory;

loading a plurality of calibration tables into the second memory wherein each calibration table has a unique address and contains calibration data for a specific group of vehicles;

addressing one of the calibration tables based on the selectable indicator; and loading the one of the calibration tables into the working third memory for automatically calibrating the control logic according to the vehicle in which it is mounted.

2. The method as claimed in claim 1 wherein the first memory is a non-volatile memory.

3. The method as claimed in claim 2 wherein the non-volatile memory is non-volatile RAM.

4. The method as claimed in claim 3 wherein the second memory is read-only memory.

5. The method as claimed in claim 1 wherein the calibration data is trim constant data and the selectable indicator has a value which is used to determine which calibration table to use.

6. The method as claimed in claim 1 further comprising the step of resetting the control unit after the step of loading the selected indicator into the first memory and prior to the step of addressing.

7. The method as claimed in claim 1 wherein the first memory has a plurality of storage locations and wherein the step of loading the selectable indicator includes the step of storing the selectable indicator into a plurality of locations of the first memory to obtain redundancy.

8. The method as claimed in claim 7 further comprising the step of comparing the value of the selectable indicator in each of the plurality of locations and wherein the step of addressing is based on the step of comparing.

9. A method for manufacturing and automatically calibrating control logic of a vehicle control system including a vehicle-mounted, microprocessor-based control unit having a non-volatile RAM with a plurality of storage locations, an addressable read-only memory, and a working third memory, the method comprising the steps of:

loading a plurality of calibration tables into the read-only memory wherein each calibration table has a unique address and contains trim constant data for a particular group of vehicles;

loading a selectable trim indicator into a plurality of locations of the non-volatile RAM to obtain redundancy;

resetting the control unit;

comparing the value of the selectable indicator in each of the plurality of locations;

addressing one of the calibration tables based on the step of comparing; and loading the one of the calibration tables into the working third memory for automatically calibrating the control logic of the control unit according to the vehicle in which it is mounted.

10. A system for automatically calibrating control logic of a vehicle control system including a vehicle-mounted, microprocessor-based control unit including an addressable memory and a working memory, the system comprising:

a non-volatile memory for storing a selectable indicator; and a plurality of addressable calibration tables stored in the addressable memory wherein each calibration table has a unique address and contains calibration data which corresponds to characteristics of a particular group of vehicles, one of the calibration tables being selected by the selectable indicator to automatically load the calibration data required to calibrate the control logic of the control unit for the vehicle on which the control unit is mounted into the working memory to thereby automatically calibrate the control logic.

11. The system as claimed in claim 10 wherein non-volatile memory is non-volatile RAM.

12. The system as claimed in claim 11 wherein the non-volatile memory has storage locations and wherein the selectable indicator is stored in a plurality of the storage locations in the non-volatile memory to obtain redundancy.

13. The system as claimed in claim 12 further comprising means for comparing the value of the selectable indicator in each of the plurality of locations wherein the one of the tables is selected based upon the comparison.

14. The system as claimed in claim 10 wherein the addressable memory is read-only memory.

15. The system as claimed in claim 10 wherein the calibration data is trim constant data and the selectable indicator ha a value which is used to determine which calibration table to use.

16. A system for automatically calibrating control logic of a vehicle control system including a vehicle-mounted, microprocessor-based control unit including an addressable read-only memory and a working memory, the system comprising:

a non-volatile RAM including a plurality of storage locations for storing a selectable trim indicator in a plurality of locations thereof to obtain redundancy;

means for comparing the selectable indicator in each of the plurality of locations; and a plurality of addressable calibration tables stored in the addressable memory wherein each calibration table has a unique address and contains trim constant data which corresponds to characteristics of a particular group of vehicles, one of the calibration tables being selected based upon the comparison to automatically load the trim constant data required to calibrate the control logic of the control unit for the vehicle on which the control unit is mounted into the working memory to thereby automatically calibrate the control logic of the control unit.

* * * * *